United States Patent
Zhu

(10) Patent No.: US 11,679,761 B2
(45) Date of Patent: Jun. 20, 2023

(54) FORWARD COLLISION WARNING ALERT SYSTEM FOR AUTONOMOUS DRIVING VEHICLE SAFETY OPERATOR

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 583 days.

(21) Appl. No.: 16/839,600

(22) Filed: Apr. 3, 2020

(65) Prior Publication Data

US 2021/0309215 A1    Oct. 7, 2021

(51) Int. Cl.
*B60W 30/09*     (2012.01)
*B60W 30/095*    (2012.01)
*H04L 12/40*     (2006.01)

(52) U.S. Cl.
CPC ........ *B60W 30/09* (2013.01); *B60W 30/0953* (2013.01); *H04L 12/40* (2013.01); *H04L 2012/40215* (2013.01)

(58) Field of Classification Search
CPC ... B60W 30/09; B60W 30/0953; H04L 12/40; H04L 2012/40215
See application file for complete search history.

(56) References Cited

U.S. PATENT DOCUMENTS

| 2014/0032049 A1* | 1/2014 | Moshchuk | G08G 1/166 701/42 |
| 2017/0129434 A1* | 5/2017 | Sun | B60W 30/08 |

FOREIGN PATENT DOCUMENTS

| EP | 2085279 A1 * | 8/2009 | ......... B62D 15/0265 |
| EP | 3178715 A1 * | 6/2017 | ............... B60Q 9/00 |
| WO | WO-2005027076 A1 * | 3/2005 | ........... B60R 21/013 |

OTHER PUBLICATIONS

FR-2726388-A1 with English Translation (Year: 1996).*

* cited by examiner

*Primary Examiner* — Calvin Cheung
(74) *Attorney, Agent, or Firm* — Womble Bond Dickinson (US) LLP

(57) ABSTRACT

In one embodiment, a first trajectory is generated for a driving environment using control values allowed for a driving-by-wire system. If the trajectory includes a collision with an object, the ADV estimates the time of the collision and the relative speed between the ADV and the object at the time of the collision. A second trajectory is then generated for the driving environment using control values allowed for a human driver. The time of the collision and the relative speed between the ADV and the object at the time collision on the second trajectory are also estimated. The ADV then compares the two collision times and the two relative speeds, and based on the comparison, generates an alert message for the human driver to take over the control of the ADV.

20 Claims, 7 Drawing Sheets

FORWARD COLLISION WARNING ALERT SYSTEM FOR AUTONOMOUS DRIVING VEHICLE SAFETY OPERATOR

TECHNICAL FIELD

Embodiments of the present disclosure relate generally to operating autonomous vehicles. More particularly, embodiments of the disclosure relate to generating a warning for a human safety operator when manual driving reduces the probability of a collision.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An autonomous vehicle driving vehicle (ADV) can be operated by a driving-by-wire system or a human driver. Typically, by design, a driving-by-wire system does not have the same control power as a human driver. For example, the deceleration designed for the driving-by-wire system is limited to 0.2G, while the deceleration achieved by a human driver can be 0.6G. Such a design is to minimize the possibility that the ADV may make extreme movements. However, such a design also limits the ability of the vehicle. As a result, the ADV in a manual mode may reduce the probability of a collision that is to occur if the ADV would be operating in an autonomous mode.

Therefore, as the last resort for safety, a human driver typically sits in the ADV to watch for any danger and to take over the control of the ADV if based on his judgement the driving-by-wire system cannot handle the danger. However, the above scenario requires the human driver to be attentive to the outside environment and the ADV itself all the time, which is a demanding requirement.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
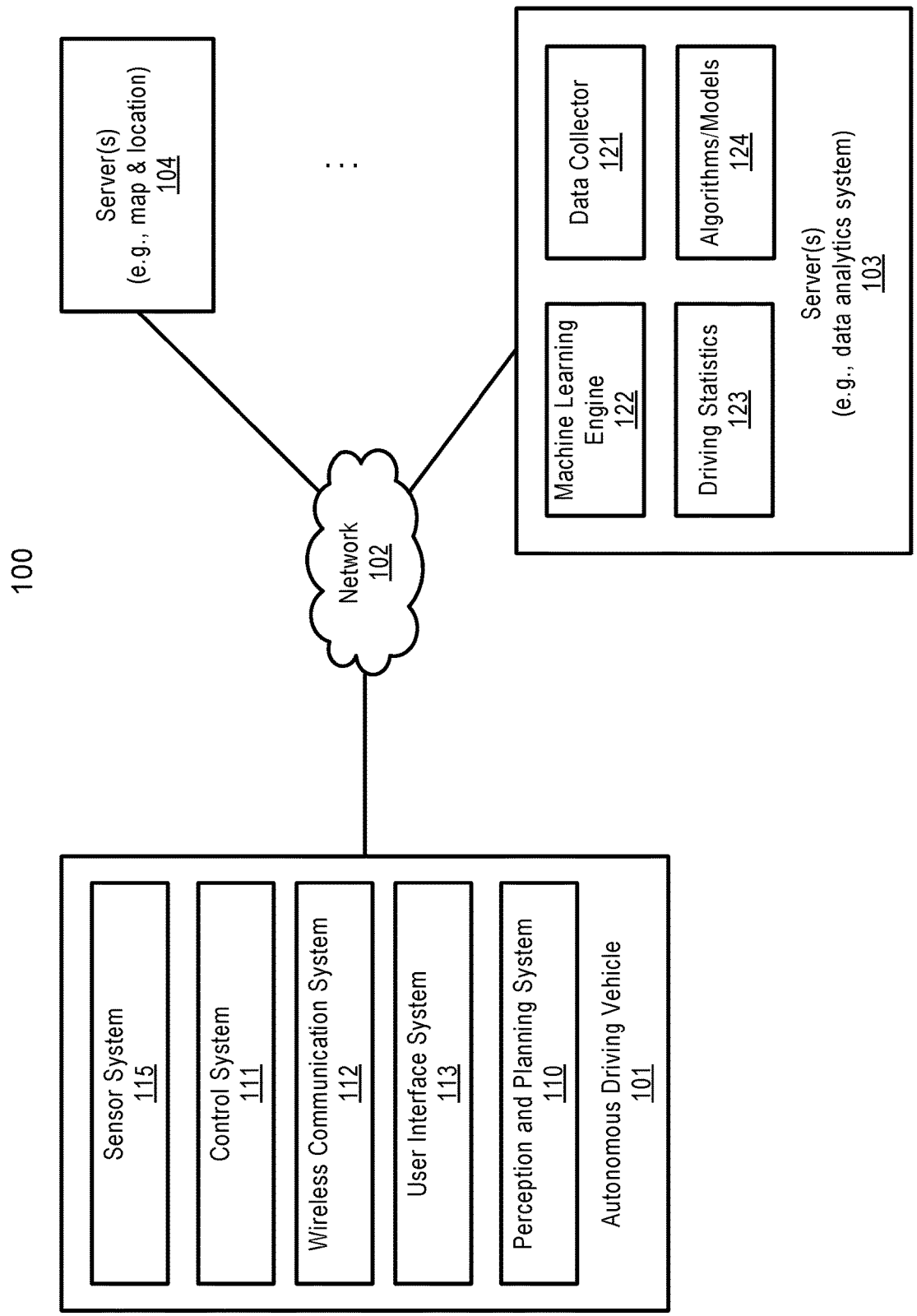
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, described herein are systems and methods for generate an alert to notify a human driver of a potential danger so that the human driver can take over the control of the vehicle. In one embodiment, a first trajectory is generated for a driving environment using control values allowed for a driving-by-wire system. If the trajectory includes a collision with an object, the ADV estimates the time of the collision and the relative speed between the ADV and the object at the time of the collision. A second trajectory is then generated for the driving environment using control values allowed for a human driver. The time of the collision and the relative speed between the ADV and the object at the time collision on the second trajectory are also estimated. The ADV then compares the two collision times and the two relative speeds, and based on the comparison, generates an alert message for the human driver to take over the control of the ADV.

In one embodiment, for the ADV to generate the alert message, the first time of the collision needs to be earlier than the second time of the collision, indicating that the collision is to be delayed on the second trajectory. In addition, the absolute value of the first relative speed needs to be greater than the absolute value of the second relative speed, indicating that the damage of the collision would be reduced if a greater braking force/deceleration is used to stop the vehicle.

In one embodiment, the first set of control values and the second set of control values both include a value for deceleration and a value for wheel steering. The first set of control values are maximal control values for the ADV operating in an autonomous driving mode, and the second set of control values are maximal control values for the ADV that is in a manual driving mode.

In one embodiment, the alert message can be sent via a Controller Area Network (CAN bus) in the ADV, either to a display screen for display, or translated into a horn alarm. The human driver that functions as a safety operator in the ADV can stop the ADV upon reading the alert message on the display screen or hear the horn alarm.

The above summary does not include an exhaustive list of all aspects of the present invention. It is contemplated that the invention includes all systems, computer media, and methods that can be practiced from all suitable combinations of the various aspects summarized above, and also those disclosed below.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
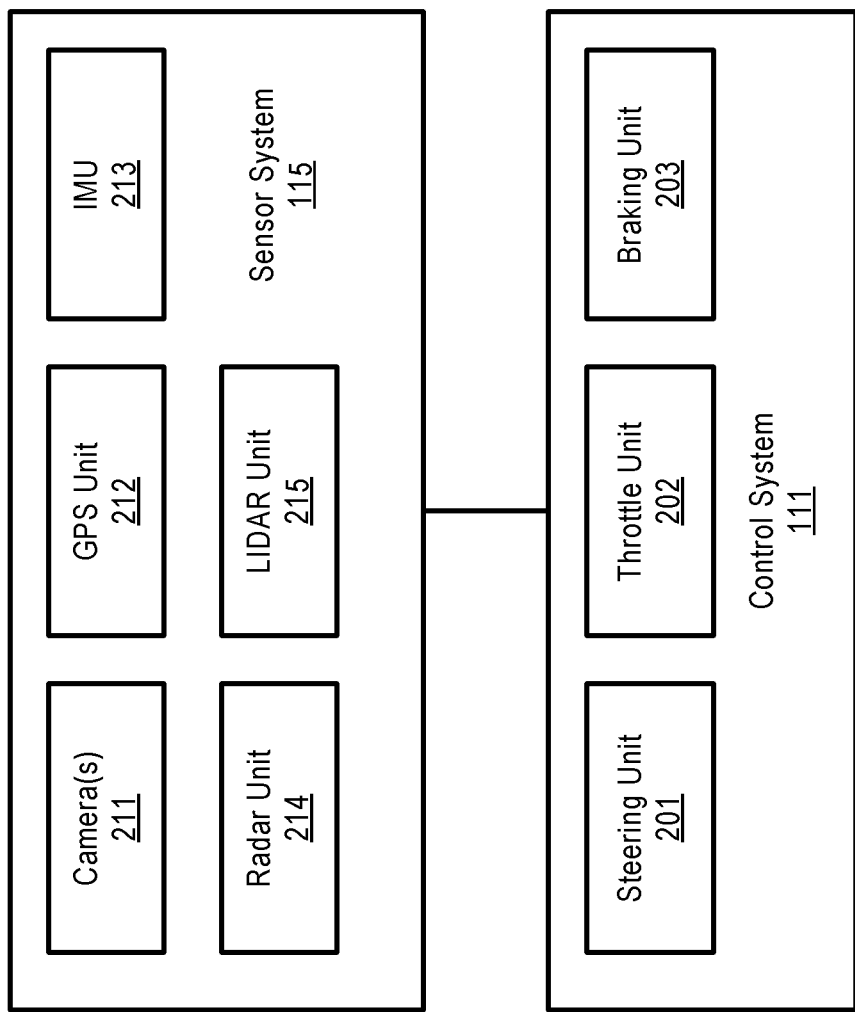
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 include an algorithm for generating an alert to an operator of an ADV in view of the driving environment surrounding the ADV. Algorithms 124 can then be uploaded on ADVs to be utilized during autonomous driving in real-time.

Figure 3A:
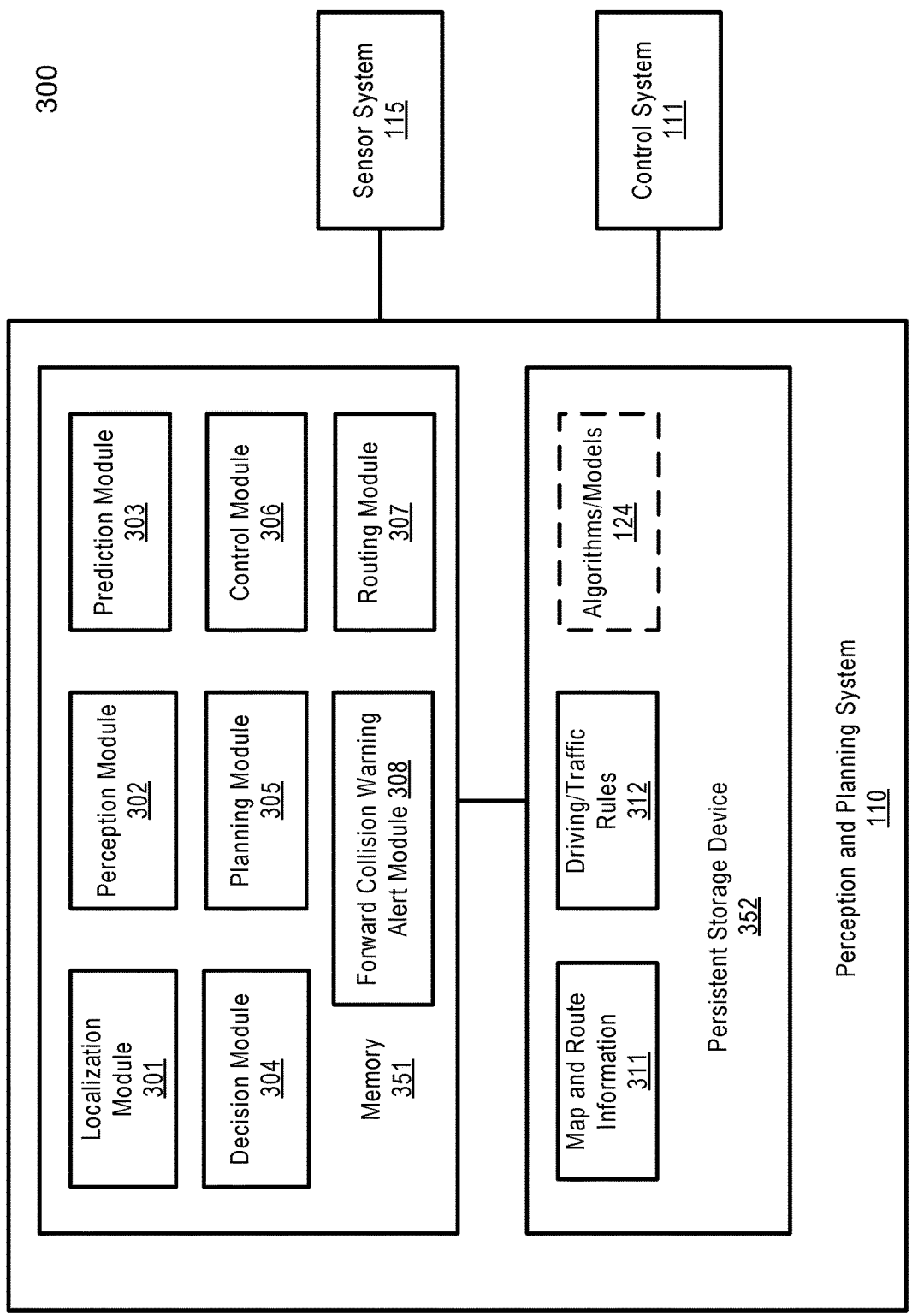
FIGS. 3A-3B are block diagrams illustrating an example of a perception and planning system used with an autonomous vehicle according to one embodiment.
Figure 3B:
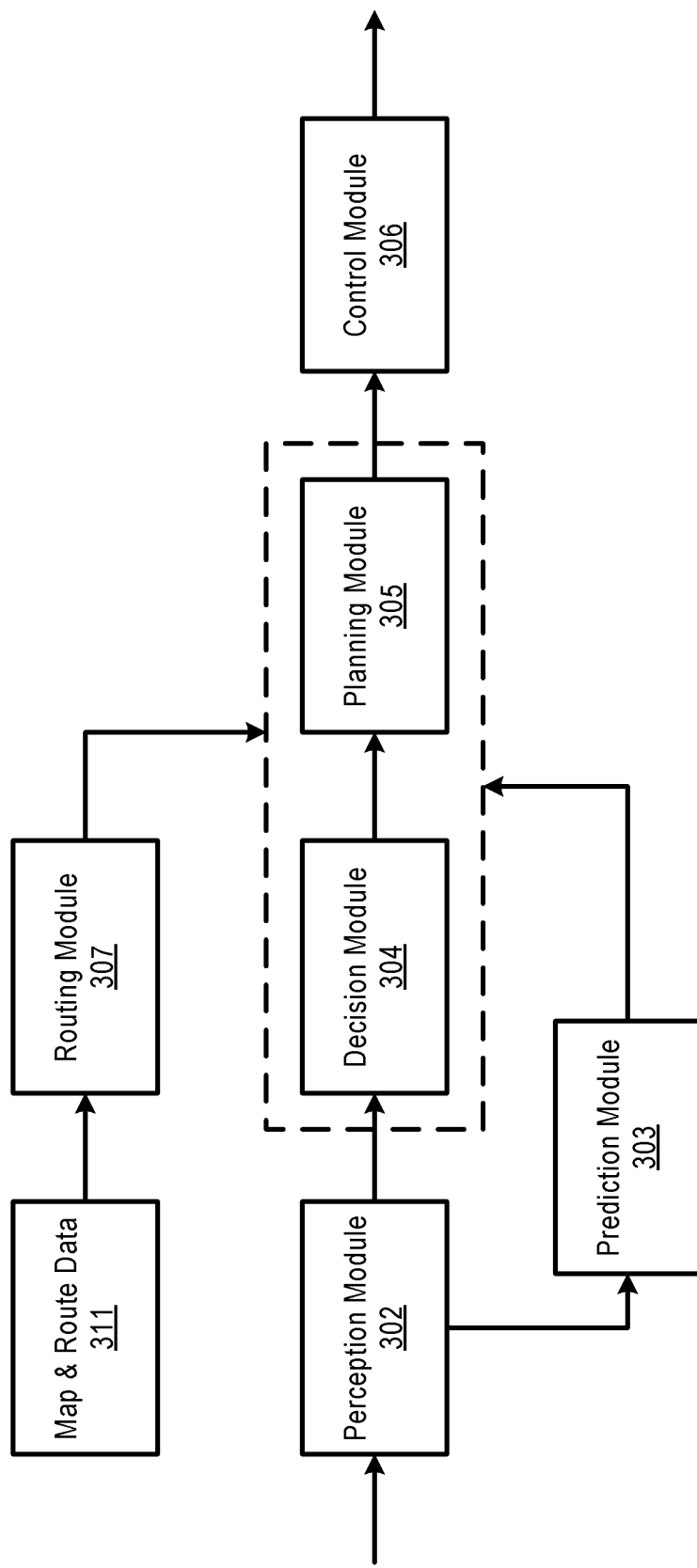

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and forward collision warning (FCW) alert module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, FCW alert module 308 may be integrated with planning module 305.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Forward collision warning alert module 308 can generate an alert message, to alert a human driver to take over the control of the ADV in the event that manual driving can avoid or reduce the probability of a collision and/or reduce the damage of the collision if the collision would eventually occur.

Figure 4:
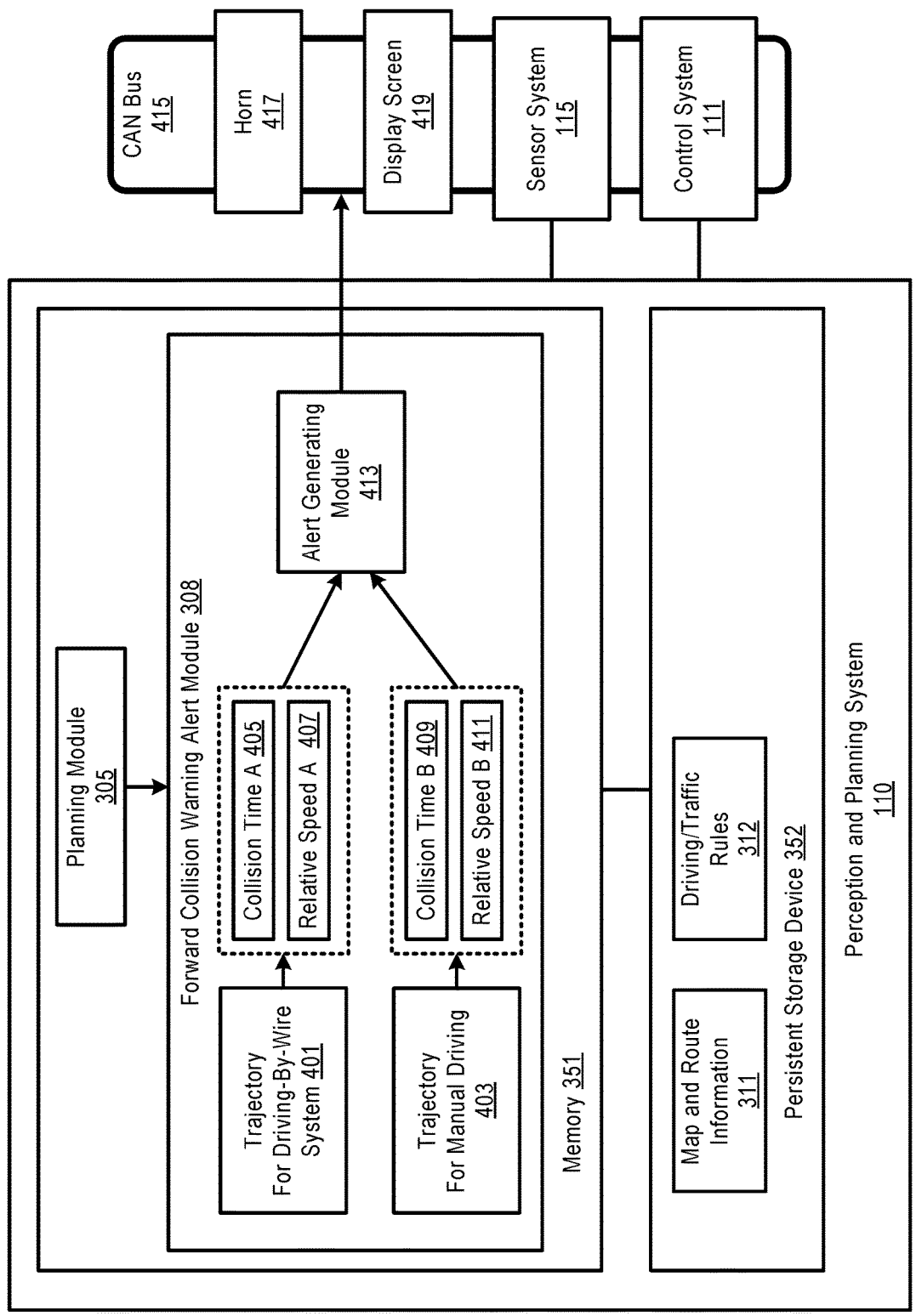
FIG. 4 is a block diagram illustrating an example of a forward collision warning alert system according to one embodiment.

FIG. 4 is a block diagram illustrating an example of a forward collision warning alert system according to one embodiment. As shown in FIG. 4, when the ADV operating in an autonomous driving mode is travelling on a road segment in a particular driving environment, the forward collision warning alert module 308 can invoke the planning module 305 and one or more other modules described in FIGS. 3A-3B to generate a trajectory 401 for the driving environment.

Since the ADV is operating in an autonomous driving mode, the ADV would generate the trajectory 401 subject to the maximal control values for the driving-by-wire system. The process of generating a trajectory is the process of finding a best plan from point A to point B subject to various constraints and physical limitations of the ADV. The maximal values for deceleration and wheel steering for the driving-by-wire are examples of the physical limitations.

When operating in an autonomous driving mode, the ADV is subject to the physical limitations of the driving-by-wire system, which by design has a maximal deceleration that is a fraction (e.g., one-third) of the maximal deceleration achieved by a human driver. The steering capability designed for the driving-by-ware system is also less than that achieved by a human driver.

If a collision is to occur between the ADV and an object on the trajectory 401, the forward collision warning alert module 308 can estimate the time of the collision 405, and the relative speed 407 between the ADV and the object. To determine whether a collision may occur, the ADV can estimate its position and the position of the object over a series of times. If both the ADV and the object are estimated to be at the same position at the same time, a collision is to occur. The speed of the ADV and the speed of the object can also be estimated, which can be used to calculate the relative speed 407 at the time of the collision between the ADV and the object.

In one embodiment, after determining that a collision is to occur on the trajectory 401, the forward collision warning alert module 308 can invoke the planning module 305 and one or more other modules described in FIGS. 3A-3B to generate another trajectory 403. The trajectory 403 is generated for manual driving and therefore subject to the maximal control values for a human driver.

If the ADV is still to collide with the object on the new trajectory 403, the forward collision warning alert module 308 can estimate the time of collision 409 and the relative speed 411 between the ADV and the object. If a collision with the object could be avoided on the new trajectory 304, the time of collision 409 would be infinite and the relative speed 411 would be zero.

In one embodiment, an alert generating module 413 can compare the time of collision 405 and the time of collision 409, and compare the absolute value of the relative speed 407 and absolute value of the relative speed 411. If the time of collision 405 is smaller than the time of collision 409, and the absolute value of the relative speed 409 is greater than the absolute value of the relative speed 411, the alert generating module 4413 can determine that with a greater deceleration, the collision can be potentially avoided. Even if the collision could not be avoided, the damage of the collision would be reduced since the relative speed on the trajectory 403 has a smaller absolute value than that of the relative speed 407 on the trajectory 401.

Thus, the alert generating module 413 can generate an alert message, and send the message to a display screen 419 via a CAN bus 415 or translates the message into a horn alarm. The horn alarm can be sent via the CAN bus 415 to a horn 417, which would sound the alarm.

As described above, a human driver can exercise greater control capabilities in terms of a number of control parameters including deceleration and steering power. Therefore, if the human driver takes over the control of the ADV upon seeing or hearing the alert message, the collision can potentially be avoided.

In one embodiment, when the time of collision 405 is smaller than the time of collision 409, there would be a delay for the collision on the trajectory 403 as opposed to the trajectory 401. A delay in collision means that the collision is more likely to be avoided, since both the ADV and the object would have more time to take additional actions to avoid the collision.

In one embodiment, when the absolute value of the relative speed 409 is greater than the absolute value of the relative speed 411, there would be less damage from the collision even if the collision would eventually occur. As such, when the forward collision warning alert module 308 determines that the time of collision 405 is smaller than the time of collision 409, and that the absolute value of the relative speed 409 is greater than the absolute value of the relative speed 411, it would generate a message to alert the human driver to take over, either to reduce the probability of the collision and/or to reduce the damage of the collision.

Figure 5:
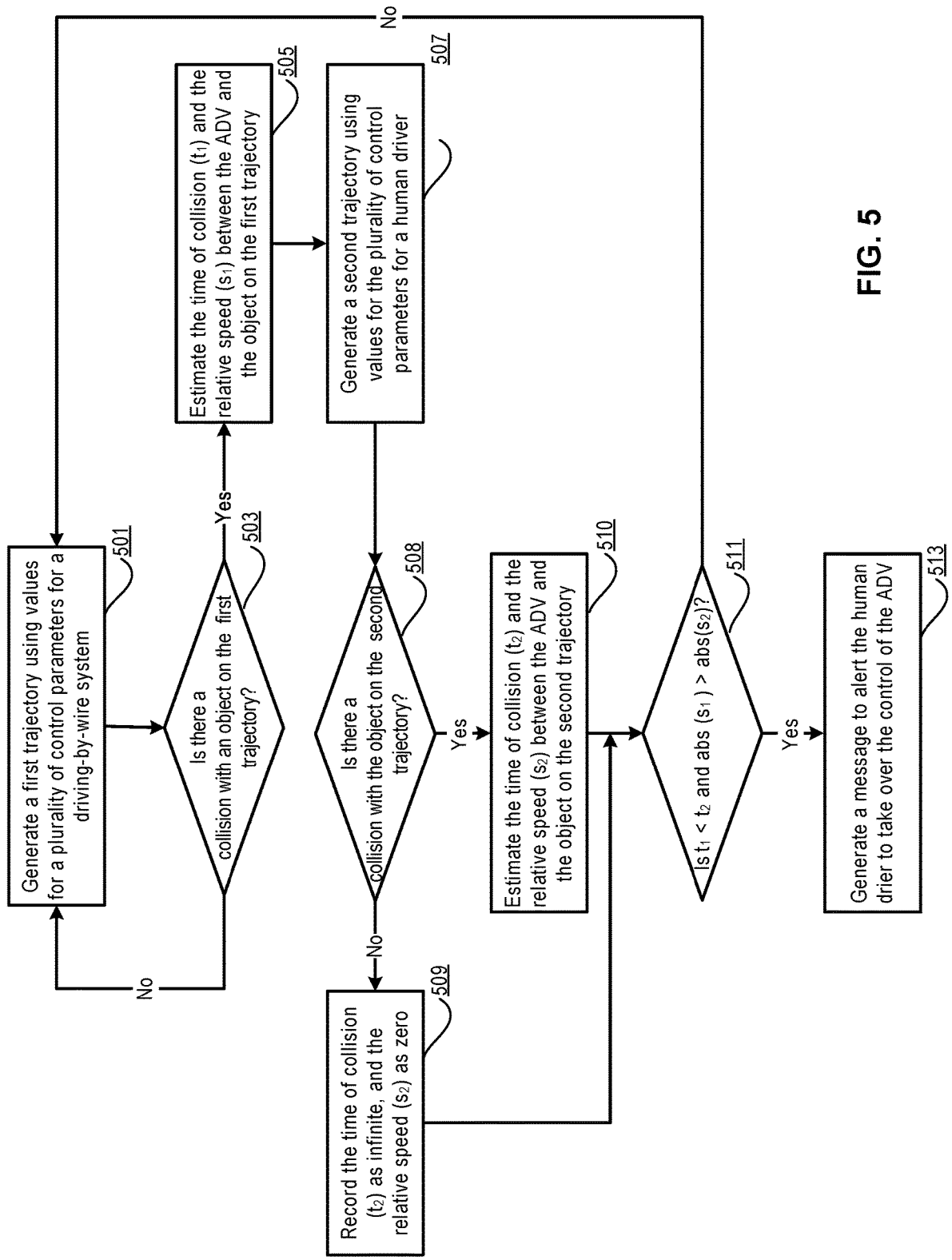
FIG. 5 is a flow diagram illustrating a process of generating an alert message according to one embodiment.

FIG. 5 is a flow diagram illustrating a process of generating an alert message according to one embodiment. Process as shown in FIG. 5 may be performed by processing logic which may include software, hardware, or a combination thereof. For example, the process may be performed by the autonomous driving system as shown in FIG. 3A. As shown in FIG. 5, in operation 501, the ADV generates a first trajectory for a driving scenario or environment using values for a number of control parameters for a driving-by-wire system. Examples of the control parameters include deceleration and the wheel steering. The value for each of the number of parameters represents a maximal allowable value by design for the driving-by-wire system. In this disclosure, the maximal value for each control parameter for the driving-by-wire system is smaller than the maximal value for the same control parameter for a human driver.

In operation 503, the ADV determines whether the trajectory generated for the driving-by-wire system includes a collision with an object. If there is no collision, the ADV would continue driving and will repeat the operation 501.

In operation 505, the ADV determines that the trajectory includes a collision with an object, and would estimate the time of collision ($t_1$) and the relative speed ($s_1$) between the ADV and the object on the first trajectory.

In operation 507, the ADV subsequently generates a second trajectory for the driving scenario or environment using values for the control parameters for a human driver.

In operation 508, the ADV determines if there is a collision with the object on the second trajectory.

In operation 509, the ADV determines there is no collision with the object on the second trajectory. Therefore, the ADV would estimate the time of collision with the object as infinite, indicating a collision with the object is not to occur on the second trajectory.

In operation 510, the ADV determines there is a collision with the object on the second trajectory. Therefore, the ADV would estimate the time of collision ($t_2$) and the relative speed ($s_2$) between the ADV and the object on the second trajectory.

In operation 511, the ADV compares $t_1$ and $t_2$, and $s_1$ and $s_2$. If $t_1$ is smaller than $t_2$ and the absolute value of $s_1$ is greater than the absolute value of $s_2$, the ADV would determine that switching to manual driving can reduce probability of the collision, and reduce the damage of the collision if the collision would eventually occur.

In operation 513, an alert message can be generated to alert the human driver to take over the control of the ADV. If the condition that $t_1$ is smaller than $t_2$ and the absolute value of $s_1$ is greater than the absolute value of $s_2$ is not satisfied, no alert message would be generated, and the ADV would continue operating in an autonomous driving mode.

Figure 6:
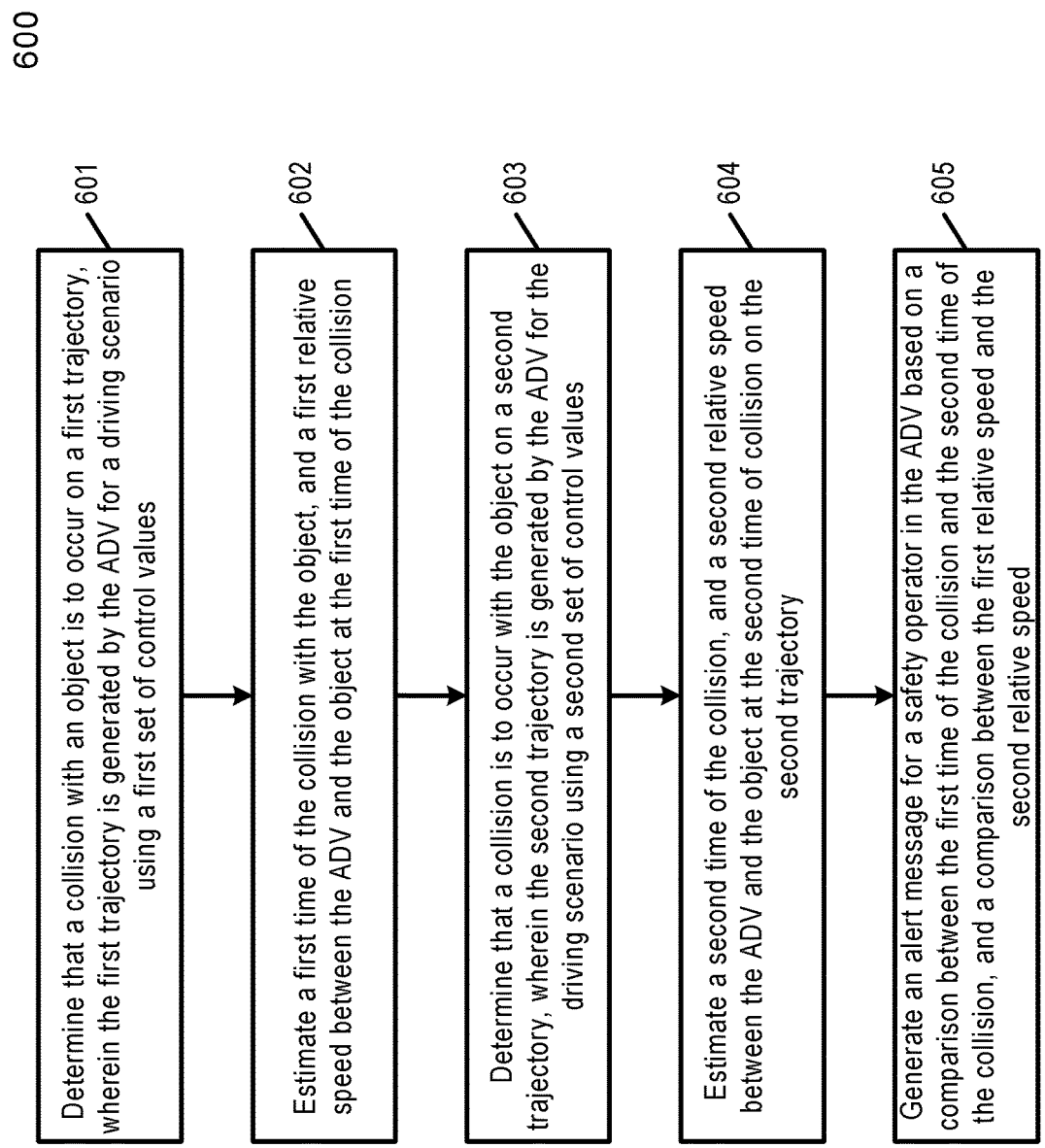
FIG. 6 is a flow diagram illustrating another process of generating an alert message according to one embodiment.

FIG. 6 is a flow diagram illustrating another process 600 of generating an alert message according to one embodiment. Process 600 may be performed by processing logic which may include software, hardware, or a combination thereof. For example, process 600 may be performed by one or more modules described FIGS. 3A-3B and FIG. 4, for example, the forward collision warning alert module 308.

Referring to FIG. 6, in operation 601, in operation 601, the processing logic determines that a collision with an object is to occur on a first trajectory. The first trajectory is generated by the ADV for a driving environment using a first set of control values. The first set of values are maximal values for a driving-by-wire system for a number of control parameters. In operation 602, the processing logic estimates a first time of the collision with the object, and a first relative speed between the ADV and the object at the first time of the collision. In operation 603, the processing logic determines that a collision is to occur with the object on a second trajectory. The second trajectory is generated by the ADV for the driving environment using a second set of control values. The second set values are maximal values for a human driver for the same control parameters described in operation 601. In operation 604, the processing logic estimates a second time of the collision, and a second relative speed between the ADV and the object at the second time of collision on the second trajectory. In operation 605, the processing logic generates an alert message for a safety operator in the ADV based on a comparison between the first time of the collision and the second time of the collision, and a comparison between the first relative speed and the second relative speed.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of generating a safety alert in an autonomous driving vehicle (ADV), comprising:
    determining that a first collision with an object is to occur on a first trajectory, wherein the first trajectory is generated by the ADV for a driving scenario using a first set of control values;
    estimating a first time of the first collision with the object, and a first relative speed between the ADV and the object at the first time of the first collision;
    in response to determining that the first collision with the object is to occur on the first trajectory, determining that a second collision is to occur with the object on a second trajectory, wherein the second trajectory is generated by the ADV for the driving scenario using a second set of control values;
    estimating a second time of the second collision, and a second relative speed between the ADV and the object at the second time of the second collision on the second trajectory; and
    generating an alert message for a safety operator in the ADV based on a comparison between the first time of the first collision and the second time of the second collision, and a comparison between the first relative speed and the second relative speed.

2. The method of claim 1, wherein the alert message is generated in response to determining that the first time of the first collision is earlier than the second time of the second collision, and that an absolute value of the first relative speed is greater than an absolute value of the second relative speed.

3. The method of claim 1, wherein the alert message is sent to a display screen via a Controller Area Network (CAN bus) in the ADV, or translated into a horn alarm, for the safety operator to read or hear.

4. The method of claim 3, wherein the alert message causes the safety operator, upon receiving the alert message, to manually stop the ADV.

5. The method of claim 1, wherein each of the first set of control values is smaller than a corresponding value in the second set of control values.

6. The method of claim 1, wherein the first set of control values and the second set of control values both include a value for deceleration and a value for wheel steering.

7. The method of claim 1, wherein the first set of control values are maximal control values when the ADV is in an autonomous driving mode, and the second set of control values are maximal control values when the ADV is in a manual driving mode.

8. A non-transitory machine-readable medium having instructions stored therein, which when executed by a processor of an autonomous driving vehicle (ADV), cause the ADV to perform operations, the operations comprising:
    determining that a first collision with an object is to occur on a first trajectory, wherein the first trajectory is generated by the ADV for a driving scenario using a first set of control values;

estimating a first time of the first collision with the object, and a first relative speed between the ADV and the object at the first time of the first collision;

in response to determining that the first collision with the object is to occur on the first trajectory, determining that a second collision is to occur with the object on a second trajectory, wherein the second trajectory is generated by the ADV for the driving scenario using a second set of control values;

estimating a second time of the second collision, and a second relative speed between the ADV and the object at the second time of the second collision on the second trajectory; and generating an alert message for a safety operator in the ADV based on a comparison between the first time of the first collision and the second time of the second collision, and a comparison between the first relative speed and the second relative speed.

9. The non-transitory machine-readable medium of claim 8, wherein the alert message is generated in response to determining that the first time of the first collision is earlier than the second time of the second collision, and that an absolute value of the first relative speed is greater than an absolute value of the second relative speed.

10. The non-transitory machine-readable medium of claim 8, wherein
the alert message is sent to a display screen via a Controller Area Network (CAN bus) in the ADV, or translated into a horn alarm, for the safety operator to read or hear.

11. The non-transitory machine-readable medium of claim 10, wherein the alert message causes the safety operator, upon receiving the alert message, to manually stop the ADV.

12. The non-transitory machine-readable medium of claim 8, wherein each of the first set of control values is smaller than a corresponding value in the second set of control values.

13. The non-transitory machine-readable medium of claim 8, wherein the first set of control values and the second set of control values both include a value for deceleration and a value for wheel steering.

14. The method of claim 8, wherein the first set of control values are maximal control values when the ADV is in an autonomous driving mode, and the second set of control values are maximal control values when the ADV is in a manual driving mode.

15. A data processing system in an autonomous driving vehicle (ADV), comprising:
a processor; and
a memory coupled to the processor to store instructions, which when executed by the processor, cause the ADV to perform operations, the operations including
determining that a first collision with an object is to occur on a first trajectory, wherein the first trajectory is generated by the ADV for a driving scenario using a first set of control values;
estimating a first time of the first collision with the object, and a first relative speed between the ADV and the object at the first time of the first collision;
in response to determining that the first collision with the object is to occur on the first trajectory, determining that a second collision is to occur with the object on a second trajectory, wherein the second trajectory is generated by the ADV for the driving scenario using a second set of control values;
estimating a second time of the second collision, and a second relative speed between the ADV and the object at the second time of the second collision on the second trajectory; and
generating an alert message for a safety operator in the ADV based on a comparison between the first time of the first collision and the second time of the second collision, and a comparison between the first relative speed and the second relative speed.

16. The system of claim 15, wherein the alert message is generated in response to determining that the first time of the first collision is earlier than the second time of the second collision, and that an absolute value of the first relative speed is greater than an absolute value of the second relative speed.

17. The system of claim 15, wherein the alert message is sent to a display screen via a Controller Area Network (CAN bus) in the ADV, or translated into a horn alarm, f for the safety operator to read or hear.

18. The system of claim 17, wherein the alert message causes the safety operator, upon receiving the alert message, to manually stop the ADV.

19. The system of claim 15, wherein each of the first set of control values is smaller than a corresponding value in the second set of control values.

20. The system of claim 15, wherein the first set of control values and the second set of control values both include a value for deceleration and a value for wheel steering.

* * * * *